United States Patent
Koby-Olson

[19]

[11] Patent Number: 6,146,146
[45] Date of Patent: Nov. 14, 2000

[54] LEARNING DEVICE FOR CHILDREN

[76] Inventor: Karen S. Koby-Olson, 3068 Wilkinson Rd., Gaylord, Mich. 49735

[21] Appl. No.: 09/080,273

[22] Filed: May 15, 1998

[51] Int. Cl.[7] .................................................. G09B 1/00
[52] U.S. Cl. ........................ 434/159; 434/167; 434/171; 434/176
[58] Field of Search .................................... 434/159, 167, 434/170, 171, 176, 118

[56] References Cited

U.S. PATENT DOCUMENTS

| | | | |
|---|---|---|---|
| 2,624,127 | 1/1953 | Okahra .................................... | 434/159 |
| 3,319,357 | 5/1967 | Shreck et al. .......................... | 434/159 |
| 3,346,968 | 10/1967 | Dellinger ................................ | 434/159 |
| 3,768,179 | 10/1973 | Woodford et al. . | |
| 3,950,863 | 4/1976 | Pallishusky . | |
| 4,007,548 | 2/1977 | Cytanovich . | |
| 4,262,431 | 4/1981 | Darnell . | |
| 4,353,700 | 10/1982 | Volakakis . | |
| 4,936,780 | 6/1990 | Cogliano . | |
| 4,968,255 | 11/1990 | Lee et al. ............................. | 434/159 X |
| 5,188,533 | 2/1993 | Wood ................................... | 434/169 X |
| 5,429,513 | 7/1995 | Diaz-Plaza ........................... | 434/167 X |
| 5,433,610 | 7/1995 | Godfrey et al. . | |
| 5,484,288 | 1/1996 | DelGigante ........................... | 434/163 X |
| 5,511,980 | 4/1996 | Wood ................................... | 434/169 X |
| 5,567,159 | 10/1996 | Tehan . | |

*Primary Examiner*—Jessica J. Harrison
*Assistant Examiner*—Chanda Harris
*Attorney, Agent, or Firm*—Gifford, Krass, Groh, Sprinkle, Anderson & Citkowski, P.C.

[57] ABSTRACT

An interactive learning device for children has a housing with a front and back face. Multiple switches are located on the front face of the housing and an image of a letter of an alphabet is associated with each of the switches. The housing also supports a speaker designed to produce sounds or music and one or more display devices for displaying images. An electronic processor in the housing communicates electrically with the multiple switches, the speaker, and the one or more display screens. The processor responds to the switches to selectively cause the speaker to produce sounds and the screen to display images.

24 Claims, 3 Drawing Sheets

LEARNING DEVICE FOR CHILDREN

FIELD OF THE INVENTION

This invention relates generally to devices to assist in learning and more specifically to devices that allow a child to see and touch the letters of the alphabet and to hear phonetic sounds associated with the letters in one or more languages.

BACKGROUND OF THE INVENTION

Studies suggest that a great deal of childhood learning occurs in the very early stages, even preceding birth, and continues at an incredible rate throughout early childhood. As newborns, infants, toddlers, and small children experience and interact with the world around them, their brains attempt to organize and make sense of the sensory inputs by making and strengthening neural interconnections. Studies suggest that adult IQ is directly affected by the quantity, variety, and quality of that person's experiences and interactions as a child. The experiences and interactions of small children, and the resulting interconnections and pathways created in the child's growing brain, can be viewed as the building blocks for knowledge and intelligence. Therefore, it is critically important that small children have as many opportunities as possible to receive quality sensory inputs and to interact with the world around them in meaningful ways.

The development of language skills begins very early in childhood, possibly even before birth. The sounds heard by the child help to establish and strengthen the neural interconnections required for language. Therefore, it is desirable to expose children to sounds which make up language, correctly pronounced, so that the children may start making the neural interconnections necessary for language skills. Recent studies suggest that the development of language building blocks occurs much earlier than previously thought. Long before an infant is capable of speaking or otherwise auditorily interacting, the sounds that the infant hears help the brain to form proper interconnections and to reinforce those interconnections. Increasing the quantity and quality of these experiences increases the number of interconnections and the strength of those interconnections thereby "programming" the brain for future language use. By exposing the child to a wide variety of sounds, the child's IQ and language skills potentially increase. This is especially important where the child may have the opportunity to learn two or more languages.

Similar considerations apply to other areas of learning such as learning logical thinking and music. Studies suggest that early exposure to stimulating input helps to "program" a child's brain for learning musical skills or logical thinking.

The above considerations indicate that there is a need for devices or tools to help parents provide their growing children with stimulating input that provides the quantity, variety, and quality of sensory input necessary for healthy neural development. There are a wide variety of toys and other devices available which promote themselves as being good learning devices. However, few if any of these devices are specifically designed to provide the type of inputs necessary for optimal neural development.

As children grow and learn, their needs and abilities change. Therefore, there is a need for devices which provide passive input to a small infant as well as devices that provide interactive entertainment/education to an older child. Very small children and infants who are not yet capable of responding to instruction or even capable of manipulating an interactive device through buttons or other input means can benefit from passive learning devices that produce sounds and images designed to create and reinforce healthy neural pathways. As a child grows, and becomes capable of manipulating simple input devices such as touch sensitive buttons, the child can benefit from simple interactive learning devices. Such device could provide a variety of input devices such as colored buttons which when activated provide visual or auditory feedback. In this way, the child can come to associate certain sounds and images with other images or colors. This is an excellent way to provide a child with an understanding of the building blocks of language such as letters and letter combinations.

As the child continues to grow, and becomes capable of responding to instruction, yet more complex interactive learning devices become beneficial. For example, a device that requests the child to respond in a certain way and then rewards the child for a correct response helps the child to learn to associate certain sounds and images with other sounds and images. Once again, this can be useful in providing the tools necessary for language skills. In addition, this type of interactivity can help provide the neural interconnections which support logical and musical thinking.

Ideally, both passive and active learning modes can be incorporated into the same device so that a device with which a child is comfortable is not outgrown in a short period. Instead, the device should "grow" with the child by being capable of providing both passive and active learning modes.

SUMMARY OF THE INVENTION

There is disclosed herein an interactive learning device for children. The device has a housing with a front face and a back face. Multiple switches are located on the front face of the housing and an image of a letter of an alphabet is associated with each of the switches. A housing supports a speaker designed to produce sounds or music. One or more display screens are also located on the front face of the housing. An electronic processor in the housing communicates electrically with the multiple switches, the speaker, and the one or more display screens. The processor responds to the switches to selectively cause the speaker to produce sounds and the screen to display images.

The learning device can be operated in at least two of the disclosed modes. In one operating mode, a graphical representation of a letter is associated with each switch and activation of a switch causes the processor to activate the display screen causing the display screen to graphically trace the graphical image of the letter associated with the activated switch. In a second operating mode, a sound and an image are associated with each of the switches and activation of a switch causes the speaker to produce the sound and the display to display the image associated with the activated switch. In a third operating mode, a sound and an image are associated with each of the switches and the processor automatically sequences through the sounds and images. The processor chooses a letter, causes the speaker to produce the sound and the display to display the image associated with the letter chosen, and then the processor chooses a different letter and repeats the process. In a fourth operating mode, a spoken question is associated with each of the switches and the processor quizzes a user by choosing a switch, causing the speaker to produce the question, and rewarding the user if the chosen switch is activated.

Some versions of the interactive learning device also include switches with images of numbers associated with them. Some versions also include the capability of operating in two or more languages. Other embodiments include a projector for projecting images onto a surface.

DETAILED DESCRIPTION OF THE PREFERRED EMBODIMENT

Figure 1:
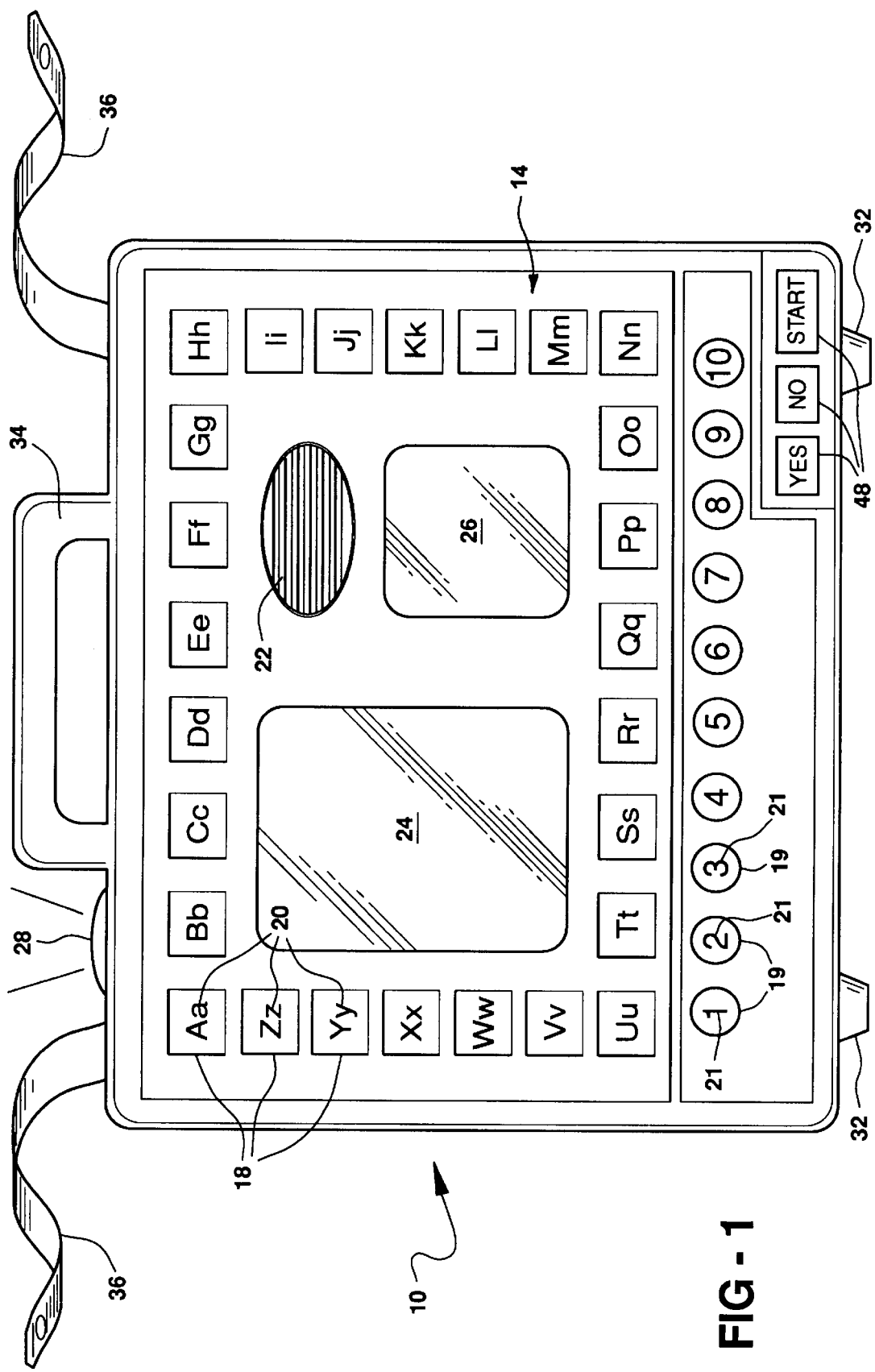
FIG. 1 is a front view of an interactive learning device according to the present invention.

Referring to the figures, an interactive learning device 10 is designed to passively or interactively expose children to a variety of sounds and images so that they develop and reinforce healthy neural interconnections as building blocks for language, logic, music and general cognitive skills. The device 10 is designed to be used to passively entertain infants as well as to interactively entertain and educate toddlers and older children who are capable of manipulating switches or buttons and of responding to spoken questions or commands.

The interactive learning device 10 includes a housing 12 having a front face 14 and a back face 16. A plurality of switches 18 are located on the front face 14 of the housing 12. The switches 18 are arranged along the four sides of rectangle. An image of a letter 20 is associated with each of the switches 18. In the preferred embodiment, the switches 18 are depressible buttons and the images 20 appear on the buttons themselves, but alternatively the images 20 may appear next to the switches 18. Also alternatively, the switches 18 may be of other types such as touch sensitive membrane switches. It is also preferred that the images 20 are made up of raised outlines of letters so that a child using the device 10 can feel the shape of the letters when they activate the switches 18. As shown, each button 18 includes both a capital and a lowercase version of a letter. Many alternatives are possible within the scope of the invention such as the letters may be recessed, only capitals or only lowercase letters may appear, or letters associated with other languages may appear. Located on the front face 14 of the housing 12 below the switches 18 are a row of additional switches 19 having images of numbers 21 displayed thereon. In the lower right hand corner of the front face 14 of the housing 16 are three additional switches 48. One is labeled "yes," one is labeled "no," and one is labeled "start." These switches 48 are used in some operating modes as discussed below. Preferably, some or all of the switches 18, 19, 48 can be illuminated.

Preferably, the housing 12 is shaped like a small briefcase and is made out of a durable material such as plastic. Feet 32 extend from the bottom of the housing 12 to support the housing if it is placed on a surface. The feet may be made of a rubber-like material to prevent scratching of a support surface and to prevent movement of the housing 12. A carrying handle 34 preferably extends from the top of the housing so that the device 10 can be carried like a briefcase. A pair of straps 36 are provided so that the device 10 can be hung from a crib rail or the like when the device 10 is being used to entertain an infant.

The interactive learning device 10 also includes a speaker 22 which is supported in the housing 12 and is designed to produce sounds. Preferably, the speaker 22 is supported by the front face 14 of the housing 12 and positioned within the rectangle formed by the switches 18 so that sound coming from the speaker 22 is projected towards a user. Alternatively, the speaker 22 may be located on the bottom side or back face 16 of the housing 12. This may be desirable to protect the speaker 22 from damage. The interactive learning device 10 also includes a first display screen 24 located on the front face 14 of the housing 12 positioned within the rectangle of switches 18. The display screen 24 is designed to display images and may be of several types as will be clear to one of skill in the art but is preferably thin, light in weight, and durable. The device 10 also preferably includes a smaller second display screen 26 located next to the larger first display screen 24 on the front face 14 of the housing 12. Alternatively or additionally, the interactive learning device 10 includes a projector 28 for projecting images on a surface spaced away from the device 10. As shown, the projector protrudes from the top of the housing 12 so that when the housing 12 is sitting upright, images would be projected from the projector 28 onto the ceiling of a room. This arrangement has particular utility when used to entertain an infant in a crib. The device 10 is suspended from a rail of the crib using the straps 36. Images are then projected upward from the projector 28 onto the ceiling so that an infant can see the images without looking at the device 10. Alternatively, the projector may project images in other directions so that the images may be displayed upon a wall or floor.

Figure 2:
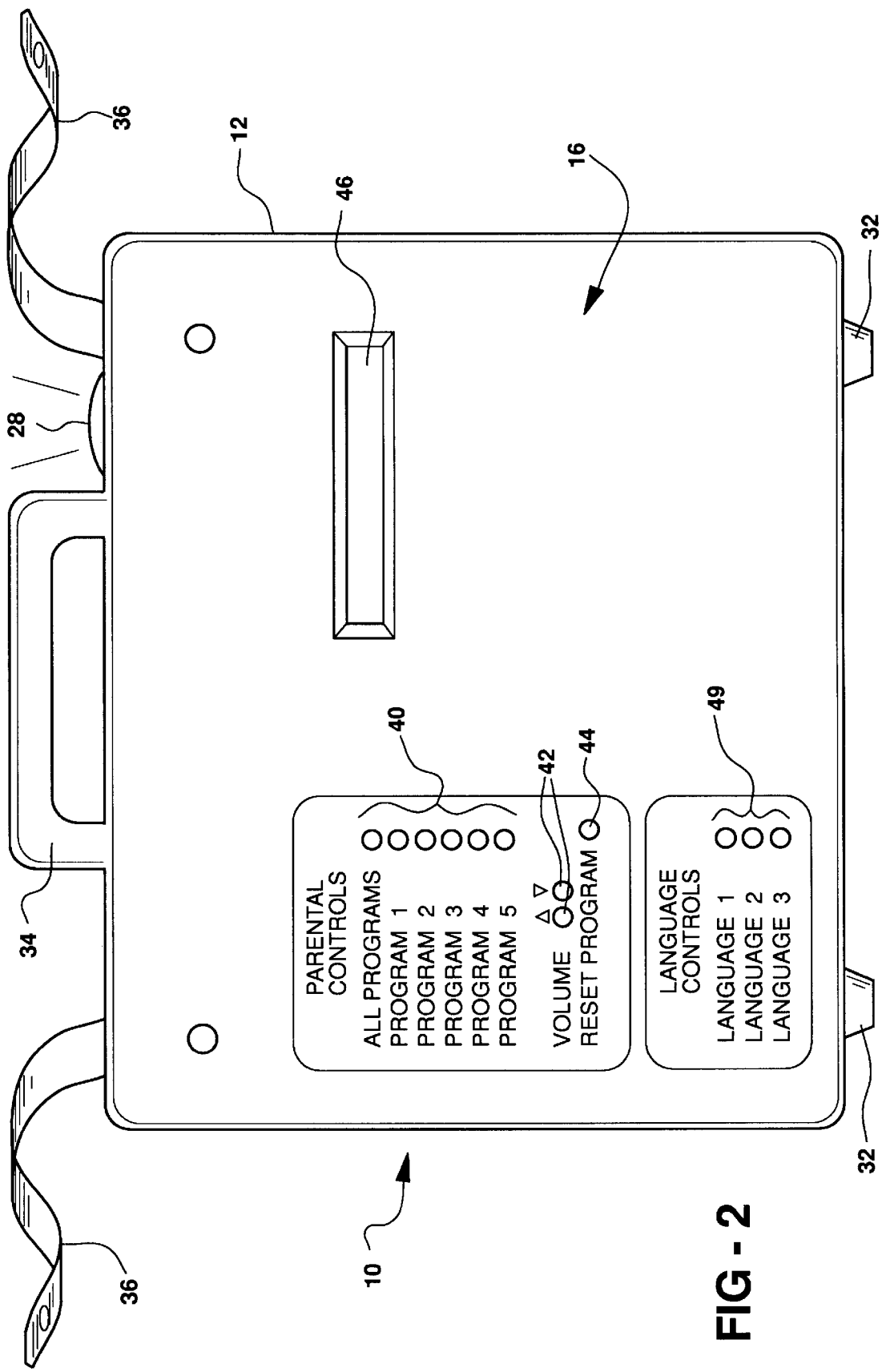
FIG. 2 is a rear view of an interactive learning device according to the present invention.

Referring now to FIG. 2, the back face 16 of the housing 12 can be seen. The back face 16 includes a variety of parental controls so that a parent may choose the operating mode and volume for the device 10. As shown, the parental controls include a plurality of program selection buttons 40, a pair of volume select buttons 42, a plurality of language selection buttons 49, and a program reset button 44. Before giving the learning device 10 to their child, a parent first uses the parental controls to determine what program or mode of the learning device 10 will be operable as well as what language is to be used. Preferably, the parent may choose to have more than one, or all, of the modes or languages operable. Also on the back face 16 of the housing 12 is a slot 46 designed to accept an audio or an audio/video cassette or cartridge. As will be clear to one of skill in the art, the device 10 will also include a mechanism internal to the housing 12 for playing the cassette. This feature is used in some embodiments of the present invention as will be described more fully below.

Figure 3:
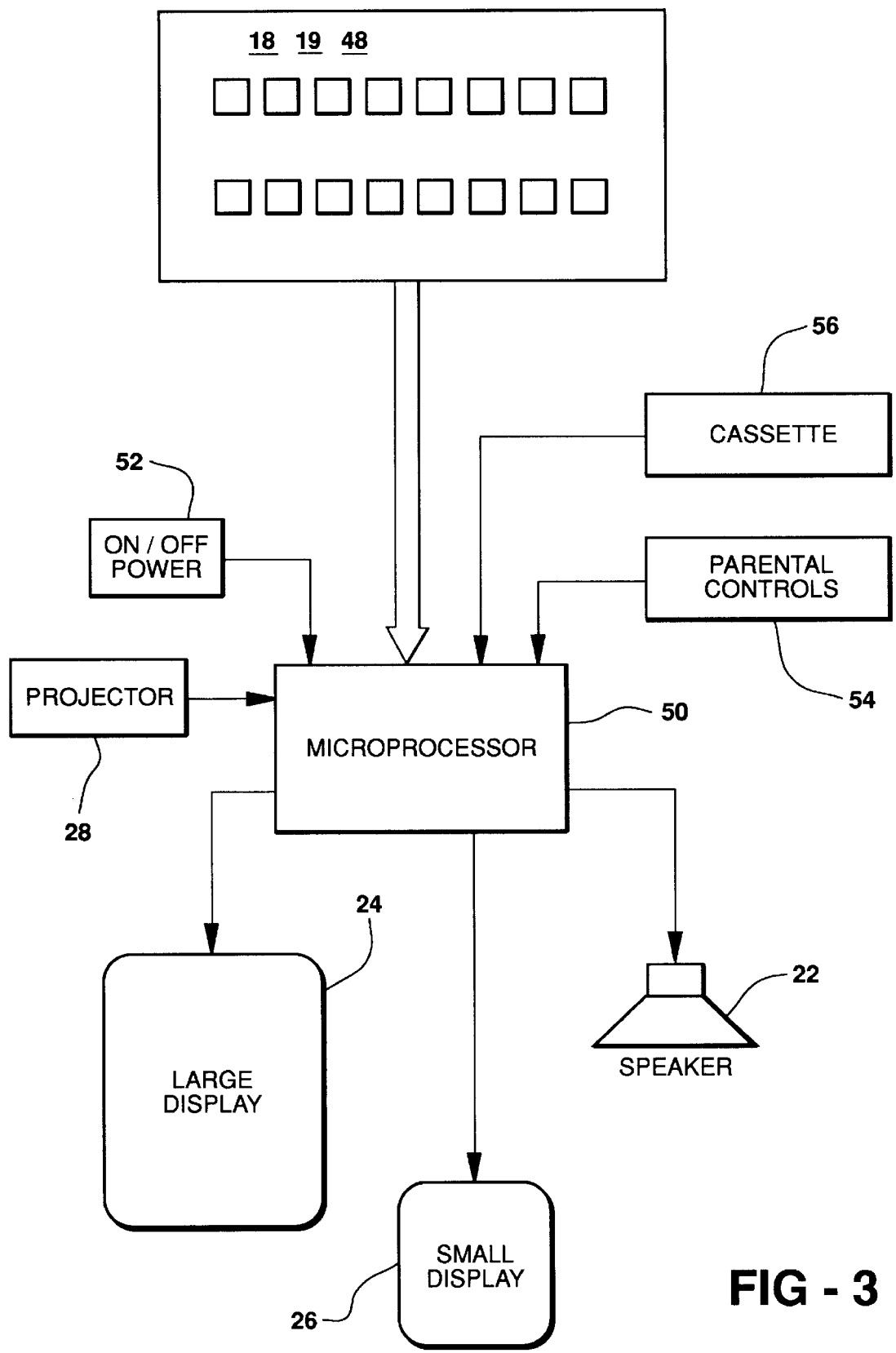
FIG. 3 is a schematic showing components of an interactive learning device according to the present invention.

Referring now to FIG. 3, a diagram of the components making up the interactive learning device 10 is shown. The central feature of the interactive learning device 10 is a microprocessor 50. As will be clear to one of skill in the art, the microprocessor 50 may be any of several designs and types and can be programmed to provide a variety of modes of operation. As shown in the diagram, a variety of inputs are provided to the microprocessor 50. An on-off switch 52 selectively provides power to the microprocessor 50. The various switches on the front face of the housing 18, 19, 48 also provides input to the microprocessor 50. Parental controls 54 and the cassette player 56 also provide inputs to the microprocessor 50. Based on the inputs to the microprocessor 50, the microprocessor selectively causes the large display 24, the small display 26, and the projector 28 to display images and the speaker 22 to produce sounds.

The interactive learning device 10 disclosed herein helps infants, toddlers, and small children to develop strong language skills and cognitive skills. Many children are not provided with the quantity, quality, and variety of sensory inputs necessary for them to reach their full potential. This may occur because the child is not given enough attention. However, inadequate sensory input can occur for other reasons. Many children suffer from frequent ear infections which interfere with their ability to hear sounds. This may cause the child to miss receiving some of the most necessary sensory input and to fall behind in proper speech development. An interactive learning device needs to address the problem of inadequate sensory input. The device 10 can provide input even when a parent or other care givers are too busy to provide a child with needed attention. The device 10 can also be used with the child suffering from ear infections. When suffering from an ear infection, children can hear part of the time and cannot hear at other times. It may be impossible for a parent or care giver to determine when the child can or cannot hear and therefore it becomes vitally important that the child receives a large quantity of sensory input so that some of the sensory input occurs when the child is able to hear. The learning device 10, unlike a parent or a care giver, do not tire of giving sensory input and can do so continuously throughout the day and night so that the child receives quality sensory input when they are capable of receiving it.

Some children, despite their parents' best attentions, have trouble developing strong language skills and cognitive skills because the parents themselves have poor language skills. A child growing up in a family with poor language skills will be less likely to be exposed to proper pronunciation of sounds which make up a language and therefore have trouble developing proper language skills. The learning device 10 can help these children to be exposed to proper pronunciations of sounds making up one or more languages. The child therefore learns the correct sounds initially and is not forced to unlearn bad habits later.

Modes of Operation

As mentioned above, the interactive learning device 10 is capable of operating in a variety of operating modes. These modes are chosen using the program selection buttons 40. Some of the operating modes are passive so that they may be used to entertain an infant. Other modes are more complex and allow a child to interact with the learning device 10.

First Operating Mode

In the first operating mode, a primary image is associated with each of the switches 18. This primary image is a graphical representation of the letter associated with the switch 18. While operating in the first mode, the processor 50 responds to activation of one of the switches 18 by causing the large display screen 24 to graphically trace the primary image associated with the activated switch. For example, if a user were to depress the button labeled with a capital "A", the processor would respond by causing the large display 24 to graphically trace the outline of a capital "A". By graphically tracing, it is meant the image forms on the large display 24 so as to appear that the letter "A" is being drawn line by line. In effect, when the child pushes the switch 18 having the image of the letter "A" on it, the learning device 10 will show the child how to properly form the letter "A". The letters may be formed as either block letters or as cursive letters.

Preferably, a second image is also associated with each of the switches 18. In this case, the primary image is a capital letter and the secondary image is a lowercase letter. As shown in FIG. 1, one of the switches 18 includes an image of a capital "A" and a lowercase "a," both on the same switch 18. Preferably, when a user pushes the button having the capital "A" and the lowercase "a" on it, the processor 50 causes the large display 24 to graphically trace a capital "A" and the small display 26 to graphically trace a lowercase "a". Alternatively, the processor may cause the large display to first graphically trace a capital "A" and then to erase this image and then to graphically trace a lowercase "a" on the same screen. Also the projector 28 may project the same image as one or both of the screens or may be activated instead of the screens.

Numerous versions of the first operating mode are possible. In one alternative, the processor causes the speaker 22 to produce a sound associated with switch 18 when the switch 18 is activated. For example, when the switch 18 having the letter "A" on it is activated, not only would the large display 24 graphically trace the letter "A", but the speaker 22 would produce the phonetic sound or sounds associated with the letter "A". As will be clear to those of skill in the art, there are many ways to present these phonetic sounds. For example, continuing with the example of the letter "A", the learning device 10 may present the sound of both a "hard A" and a "soft A". Instead, the learning device may say the words "big A" after graphically tracing a capital "A" and say the words "little a" after graphically tracing a lowercase "a". The learning device 10 may also repeat the same phonetic sound multiple times to help reinforce association between the letter and the sound.

If one of the buttons 19 having the image of a number 21 displayed thereon is activated while the learning device 10 is in the first operating mode, the large display 24 graphically traces the image of the number associated with the activated switch. In those versions where a secondary image is to be displayed on the small display 26, that image is a picture of a number of items such as smiling faces, the number of the items corresponding to the number on the switch 19.

Second Operating Mode

When the interactive learning device 10 is in the second operating mode, a primary sound and a primary image are associated with each of the switches 18. Activation of a switch 18 causes the speaker to produce the primary sound associated with the activated switch 18 and causes the display 24 to display the primary image associated with the activated switch. In the second mode, the primary image may be an image of the letter associated with the activated switch 18 as in the first operating mode, but an image may also be a word which contains the letter associated with the activated switch 18. For example, when the button 18 with the image of a capital "A" and a lowercase "a" is activated, the primary image displayed may be the word "cake" or the word "apple". Continuing with this example, the primary sound associated with the activated switch 18 would be the sound of the word "cake" or the word "apple". These words were chosen for this example because they illustrate a preferred version of operating mode 2. While both words include the letter "A", the word "cake" uses the "hard a" sound while the word "apple" uses the "soft a" sound.

The second operating mode is designed to help a child learn to associate various phonetic sounds of a letter with that letter and to teach the child to use those sounds as part of a word. In accordance with these objectives, it is preferred that a secondary sound and a secondary image also be associated with each of the switches 18. In the switch marked "Aa" it is preferred that the primary image be a capital "A" and a lowercase "a" together as the letters appear on the associated button. It is preferred that the secondary image be the word "cake". It is preferred that the primary sound be the sound of a "hard a" and the secondary sound be the words "A as in cake". In operation, when the button 18 with "Aa" is activated, the learning device 10 will first display the primary image "Aa" on the large display screen 24 and produce the sound of a "hard a". This will help a child to associate the sound and image. Following this, the learning device 10 will display the word "cake" on the small screen and will produce the phrase "A as in cake". This will further help to associate the sounds and images as well as teach the child a word which properly uses the sound of a "hard a". Many variations are possible upon this basic theme and it is preferred that the secondary image include a picture of a cake as well as spelling out the word "cake" in both uppercase and lowercase letters. It is also preferred that other secondary images and primary and secondary sounds be associated with a particular button 18. Continuing with the example of "Aa" the additional primary sound would be the sound of a "soft a", the additional secondary image is an image of an apple along with the word "apple" spelled out in both uppercase and lowercase letters, and the additional secondary sound is the phrase "a as in apple". In producing these additional sounds and images, the learning device also teaches the child sounds, images, and words associated with a "soft a". As will be clear to one of skill in the art, other sounds and images may also be associated with a given button where the letters have multiple possible phonetic sounds. Some letters may have only one set of sounds while others will have many sounds. Representing sounds associated with the various letters of the alphabet, the child is exposed to all of the sounds which make up a language therefore preparing them for strong language skills. The learning device 10 preferably operates in multiple languages. By operating the learning modes in each of the languages programmed into the learning device 10, the child is exposed to all the phonetic sounds associated with each of the languages thereby preparing the child to learn additional languages.

The second operating mode may also be responsive to activation of the buttons 19 with images of numbers 21 on them. By way of example, if a button 19 with the image of the numeral "1" is activated, the learning device 10 will display the image of the numeral "1" on the large screen 24, produce the word "one", display one item such as a smiley face on the smaller screen 26, and produce the words "one smiley face". As in the first operating mode, the learning device 10 may graphically trace the images of the letters and numerals as it produces the sounds associated therewith.

Third Operating Mode

In the third operating mode, the sound and an image are associated with each of the letters 20 associated with the switches 18. The processor 50 automatically sequences through sounds and images as follows. First the processor chooses one of the letters 21 and then causes the speaker 22 to produce the sound associated with the chosen letter and causes the large display 24 to display the image associated with the chosen letter. The processor then chooses a different letter and repeats the process. This mode is particularly adapted to infants who are not yet capable of manipulating the buttons 18 on the learning device 10. It is a passive mode. In a preferred implementation of the third operating mode, the learning device uses the second display screen 26 and may also display images using the projector 28. In one preferred version of the third operating mode, the processor 50 causes the large display 24 to display a capital letter while the small screen 26 displays a lowercase letter and the speaker produces the sound of the letter. These images then fade out and are replaced with a capital letter and a lowercase letter being graphically traced so as to appear that the letters are being drawn line by line. The speaker 22 produces the words "big A" as a capital "A" is being drawn and says "little a" as the lowercase "a" is being graphically traced. The processor then chooses a different letter and repeats the steps. The sequence in which the processor 50 chooses the letters 20 may be in alphabetical order or may be random. The speaker 22 may also produce music to accompany the automatic sequencing. For example, the speaker 22 may produce the alphabet song as the processor 50 quickly sequences through the letters in alphabetical order. In this case the sounds and images would be coordinated with the song so that the image of a letter is displayed as the name of the letter is sung in the song. The third operating mode can also include numbers 21 which appear on the buttons 19. The processor would pick a number, display an image of that number, and display a picture of one item. The speaker 22 would produce the name of the numeral as it appears and say "one smiley face" as an image of a single smiley face appears such as would be the case if the numeral "1" were the chosen numeral.

The button 48 marked "start" can be used with this mode to start the processor automatically sequencing. Alternatively, the processor 50 can respond to activation of any of the switches 18 or 19 so that it starts the automatic sequencing with the number or letter associated with the switch 18 or 19 activated.

Fourth Operating Mode

The fourth operating mode is an active operating mode which quizzes the child concerning the associations between sounds and letters. With the learning device 10 in the fourth operating mode, the child pushes the start button 48 to begin the quiz. The processor 50 causes the speaker 22 to produce words forming a spoken question such as "push on the A". The child then pushes the button 18 with "Aa", and the processor 50 rewards the child. The reward may take the form of the speaker 22 producing a positive message such as "good job" and images of the letter or letters appearing on the display screens 24, 26. Alternatively, one of the display screens may display a pleasing image such as a smiling face. If the child does not push the correct button, the processor 50 creates a non-reward message. This non-reward message could take the form of the speaker 22 producing the words "no, try again" and one of the display screens 24, 26 displaying an image such as a frowning face. The fourth operating mode may also produce other types of questions such as displaying an image and illuminating one of the buttons and asking the child if the button goes with the image. In this case, the child would use the "yes" and "no" buttons 48 to respond to the question. This mode may also operate in more than one language so as to reinforce language skills in multiple languages.

Fifth Operating Mode

The fifth operating mode is a storytelling mode which is passive. To use this mode, a cassette or cartridge is inserted in slot 46 for playback. The learning device 10 then proceeds to play the sounds recorded on the tape which may be a story. As the story proceeds, the learning device will display images corresponding to events in the story on the display screens 24, 26 or the projector 28. The images may be stored on the cassette or cartridge with the sounds or may be separately stored. A variety of different stories will accommodate the child's need for variety and will help to accommodate children of different ages. It is intended that the story include all sounds associated with a given language to help expose the child to all sounds necessary for good communication skills. Alternatively, the story sounds and images can be stored on other storage medium as will be clear to one of skill in the art. This includes storing sounds and images permanently in the device 10 so that the device 10 does not require a cassette or cartridge to tell a story.

In view of the teaching presented herein, other modifications and variations of the present inventions will be readily apparent to those of skill in the art. The foregoing drawings, discussion, and description are illustrative of some embodiments of the present invention, but are not meant to be limitations on the practice thereof. It is the following claims, including all equivalents, which define the scope of the invention.

I claim:

1. An interactive learning device for children comprising:

a housing having a front face and a back face;

a plurality of switches located on said front face of said housing, each switch having an image of a letter of an alphabet associated therewith;

a speaker supported in said housing for producing sounds;

a first electronic display screen located on said front face of said housing for displaying images;

an electronic processor in said housing, said processor in electrical communication with the plurality of switches, the speaker, and the first electronic display screen, said processor responsive to said switches to selectively cause said speaker to produce sounds and said screen to display images, said learning device being operable in at least two modes being selected from the group consisting of;

a first operating mode wherein;
  a primary image is associated with each of said switches, each primary image being a graphical representation of the letter associated with the switch; and
  activation of one of said switches causes said processor to activate said first electronic display screen so that said first electronic display screen graphically traces the primary image associated with the activated switch;

a second operating mode wherein;
  a primary sound and a primary image are associated with each of said switches; and
  activation of one of said switches causing said speaker to produce the primary sound associated with the activated switch and causing said first electronic display screen to display the primary image associated with the activated switch.

a third operating mode wherein;
  a sound and an image are associated with each of the letters associated with said switches; and
  said processor automatically sequences through said sounds and images, the automatic sequencing comprising the steps of
    a) said processor choosing a letter;
    b) said processor causing said speaker to produce the sound associated with the chosen letter and causing the first electronic display screen to display the image associated with the chosen letter;
    c) said processor choosing a different letter; and
    d) returning to step b.

a fourth operating mode wherein;
  a series of sounds comprising a spoken question are associated with each of the switches;
  said processor quizzes a user, the quizzing comprising the steps of
    a) said processor choosing one of said switches;
    b) said processor causing said speaker to produce the sounds comprising the spoken question for the chosen switch;
    c) said processor waiting for a switch to be activated, and when a switch is activated, determining what switch is activated;
    d) if the activated switch is the chosen switch, said processor causing said speaker to produce a reward sound, and skipping to step f;
    e) if the activated switch is not the chosen switch, said processor causing said speaker to produce a non-reward sound, and returning to step c;
    f) said processor choosing a different one of said switches;
    g) returning to step b; wherein one of said two modes is the third operating mode.

2. The interactive learning device of claim 1, wherein said processor is selectably operable to cause said speaker to produce sounds and said first electronic display screen to produce images corresponding to at least two different languages.

3. The interactive learning device of claim 1, further comprising a second electronic display device disposed on said housing for displaying images.

4. The interactive learning device of claim 3, wherein said second electronic display device is a projector for projecting images on a surface spaced from said learning device.

5. The interactive learning device of claim 3, wherein said second display device is a second electronic display screen located on said front face of said housing.

6. The interactive learning device of claim 5, wherein said first mode further comprises a secondary image associated with each of said switches, each secondary image being another graphical representation of the letter on the switch, and activation of one of said switches causes said processor to activate said second display screen so that said second display screen graphically traces said secondary image associated with the activated switch.

7. The interactive learning device of claim 6, wherein said primary images are capital letters and said second secondary images are lowercase letters.

8. The interactive learning device of claim 1, wherein said first mode further comprises a sound associated with each switch, each sound being a phonetic pronunciation of the letter associated with the switch, and activation of one of said switches causes said processor to activate said speaker so that said speaker produces the sound associated with the activated switch.

9. The interactive learning device of claim 1, wherein said switches comprise depressible buttons.

10. The interactive learning device of claim 1, wherein said images of letters comprise raised outlines of the letters.

11. The interactive learning device of claim 1, wherein said sounds associated with each switch in said second mode comprise phonetic pronunciations of the letters associated with each switch.

12. The interactive learning device of claim 5, wherein said second mode further comprises a secondary image associated with each of said switches, and activation of one of said switches causes said processor to activate said second display screen so that said second display screen displays said secondary image.

13. The interactive learning device of claim 12, wherein said primary image comprises a graphical representation of the letter associated with the activated switch and said secondary image comprises a word including the letter associated with the activated switch.

14. The interactive learning device of claim 12, wherein said primary image comprises a graphical representation of the letter associated with the activated switch and said secondary image comprises an image of an object, a name for the object including the letter associated with the activated switch.

15. The interactive learning device of claim 1, wherein said images of the letters associated with the switches are illuminable.

16. The interactive learning device of claim 15, wherein activation of each switch causes the image of the letter associated with the activated switch to illuminate.

17. The interactive learning device of claim 15, wherein step "b" in said third mode further comprises illuminating the image of the letter matching the chosen letter.

18. The interactive learning device of claim 1, wherein step "a" in said third mode comprises said processor choosing said letters in alphabetical order.

19. The interactive learning device of claim 1, wherein said third mode further comprises said processor causing said speaker to produce music during said automatic sequencing.

20. The interactive learning device of claim 1, wherein said third mode further comprises said image associated with each of said switches being a graphical representation of the letter on the switch, and wherein said displaying in step "b" comprises graphically tracing the graphical representation of the chosen letter.

21. The interactive learning device of claim 1, wherein step "d" in said fourth operating mode further comprises said processor causing said display to display a reward image if the activated switch is the chosen switch, and wherein step "e" in said fourth operating mode further comprises said processor causing said display to display a non-reward image if the activated switch is not the chosen switch.

22. The interactive learning device of claim 1, further comprising a means for playing a prerecorded message in electrical communication with said electronic processor, said processor responsive to said playing means to cause said speaker to produce sounds and said screen to display images.

23. The interactive learning device of claim 22, further comprising a fifth operating mode wherein a prerecorded message is played by said playing means and said processor causes said speaker to produce sounds and said screen to display images.

24. The interactive learning device of claim 1, further comprising a plurality of switches located on said front face of said housing, each switch having an image of a number associated therewith.

* * * * *